(12) United States Patent
Kim et al.

(10) Patent No.: US 11,465,044 B2
(45) Date of Patent: Oct. 11, 2022

(54) METHOD AND SYSTEM FOR PROVIDING GAME BASED ON VIDEO CALL AND OBJECT RECOGNITION

(71) Applicant: LINE Corporation, Tokyo (JP)

(72) Inventors: Keum Ryong Kim, Seongnam-si (KR); Seeun Kim, Seongnam-si (KR); Jung Young Lee, Seongnam-si (KR)

(73) Assignee: LINE Corporation, Tokyo (JP)

( * ) Notice: Subject to any disclaimer, the term of this patent is extended or adjusted under 35 U.S.C. 154(b) by 108 days.

(21) Appl. No.: 16/121,135

(22) Filed: Sep. 4, 2018

(65) Prior Publication Data
US 2019/0070500 A1 Mar. 7, 2019

(30) Foreign Application Priority Data

Sep. 7, 2017 (KR) .......................... 10-2017-0114552

(51) Int. Cl.
*A63F 13/35* (2014.01)
*A63F 13/25* (2014.01)
(Continued)

(52) U.S. Cl.
CPC .............. *A63F 13/35* (2014.09); *A63F 13/25* (2014.09); *A63F 13/87* (2014.09); *G06V 20/40* (2022.01);
(Continued)

(58) Field of Classification Search
CPC .......... A63F 13/35; A63F 13/25; A63F 13/87; A63F 13/45; A63F 13/30; A63F 13/213; G06K 9/00281; G06K 9/00389; G06K 9/00711; G06K 9/00221; H04N 7/14; H04N 21/4788; H04N 21/4781; H04M 7/006; H04M 1/72519; G06F 3/017
See application file for complete search history.

(56) References Cited

U.S. PATENT DOCUMENTS

| | | | |
|---|---|---|---|
| 2009/0015677 A1 | 1/2009 | Harrington | |
| 2009/0202114 A1* | 8/2009 | Morin ..................... | A63F 13/12 382/118 |

(Continued)

FOREIGN PATENT DOCUMENTS

| | | |
|---|---|---|
| CN | 201750430 U | 2/2011 |
| CN | 103218843 A | 7/2013 |

(Continued)

OTHER PUBLICATIONS

Chinese Office Action dated Aug. 4, 2020 issued in corresponding Chinese Patent Application No. 201811024750.7.

*Primary Examiner* — Thomas H Henry
(74) *Attorney, Agent, or Firm* — Harness, Dickey & Pierce, P.L.C.

(57) ABSTRACT

Provided are methods and systems for providing a game based on a video call and object recognition. A game providing method of an electronic device configured as a computer including displaying game content on a video call screen in response to a video call being established between a user of the electronic device and a counterpart through a voice over Internet protocol (VoIP) channel, recognizing an object in a call image as motion data with respect to the game content, and controlling a game element corresponding to the game content using a result of the recognizing may be provided.

21 Claims, 26 Drawing Sheets

(51) Int. Cl.
*A63F 13/87* (2014.01)
*H04N 7/14* (2006.01)
*G06V 20/40* (2022.01)
*G06V 40/10* (2022.01)
*G06V 40/16* (2022.01)

(52) U.S. Cl.
CPC .......... *G06V 40/113* (2022.01); *G06V 40/171* (2022.01); *H04N 7/147* (2013.01)

(56) References Cited

U.S. PATENT DOCUMENTS

2010/0160050 A1\* 6/2010 Oku ........................ A63F 13/10
463/43
2012/0284758 A1 11/2012 Adjesson

FOREIGN PATENT DOCUMENTS

| KR | 100401262 B1 | 10/2003 |
| KR | 20090084229 A | 8/2009 |
| KR | 20120120858 A | 11/2012 |

\* cited by examiner

METHOD AND SYSTEM FOR PROVIDING GAME BASED ON VIDEO CALL AND OBJECT RECOGNITION

CROSS-REFERENCE TO RELATED APPLICATION(S)

This U.S. non-provisional application claims the benefit of priority under 35 U.S.C. § 119 to Korean Patent Application No. 10-2017-0114552 filed on Sep. 7, 2017, in the Korean Intellectual Property Office (KIPO), the entire contents of which are incorporated herein by reference.

BACKGROUND

Field

One or more example embodiments relate to technology that provides a game in a video call environment.

Description of Related Art

In recent years, communication devices have been providing various services such as a wireless Internet service, and a terrestrial/satellite broadcasting service, a voice call service, and/or a text message service.

For example, with the development of image compression technology and restoration technology and the commercialization of devices equipped with a camera, a video call service enabling a user to have a conversation with a counterpart while viewing a face of the counterpart is provided.

As an example of technology for providing a video call service, technology for providing a video call service between mobile terminals over a mobile phone network of a wireless environment is disclosed in Korean Patent Registration No. 10-0401262 registered on Sep. 29, 2003.

SUMMARY

One or more example embodiments provide methods and/or systems for providing a game based on object information included in a call image using voice over Internet protocol (VoIP) technology.

One or more example embodiments provide methods and/or systems for controlling a game element based on an object recognition result with respect to a call image in a video call environment.

According to an aspect of at least one example embodiment, a game providing method of an electronic device configured as a computer includes displaying game content on a video call screen in response to a video call being established between a user of the electronic device and a counterpart through a VoIP channel, recognizing an object in a call image as motion data with respect to the game content, and controlling a game element corresponding to the game content using a result of the recognizing.

The controlling may include synthesizing a texture of an effect corresponding to the result of the recognizing with the call image and displaying a synthetic image.

The displaying may include displaying the video call screen including a user image of the user and a counterpart image of the counterpart in response to the video call being established, and the recognizing may include recognizing a face of the user in the user image using face recognition technology.

The controlling may include transmitting the user image reflecting an effect corresponding to a result of recognizing the face in the user image to an electronic device of the counterpart concurrently while displaying the user image reflecting the effect in the video call screen.

The displaying may include displaying the video call screen including a user image of the user and a counterpart image of the counterpart in response to the video call being established, and the recognizing may include receiving gesture information of the counterpart from an electronic device of the counterpart and recognizing a position that matches the gesture information in the user image.

The controlling may include transmitting the user image reflecting an effect corresponding to a result of the recognizing the position to the electronic device of the counterpart concurrently while displaying the user image reflecting the effect on the video call screen.

The displaying may include displaying the video call screen including a user image of the user and a counterpart image of the counterpart by exchanging the user image and the counterpart image in real time in response to the video call being established, and the controlling may include transmitting a user image reflecting an effect corresponding to a result of recognizing a face in the user image to an electronic device of the counterpart concurrently while displaying the user image reflecting the effect on the video call screen, and receiving a counterpart image reflecting an effect corresponding to a result of recognizing a face in the counterpart image from the electronic device of the counterpart and displaying the counterpart image reflecting the effect on the video call screen.

The controlling may include sharing information associated with a game progress corresponding to the result of the recognizing with an electronic device of the counterpart, and determining a win and loss of the user and the counterpart based on the shared information and displaying the determined win and loss on the video call screen.

The displaying may include displaying the game content on the video call screen during the video call in response to a selection of the game content by the user or the counterpart in a messenger chatroom, which corresponds to a communication session set between an account of the user and an account of the counterpart.

The displaying may include providing the game content selected by the user or the counterpart in response to the video call being established between the user and the counterpart.

The recognizing may further include recognizing voice information of the user together.

According to an aspect of at least one example embodiment, a non-transitory computer-readable recording medium storing instructions that, when executed by a processor, cause the processor to perform the aforementioned game providing method may be provided.

According to an aspect of at least one example embodiment, a game providing system of an electronic device configured as a computer includes a memory configured to store computer-readable instructions and at least one processor configured to execute the computer-readable instructions. The at least one processor is configured to process a process of displaying game content on a video call screen in response to a video call being established between a user of the electronic device and a counterpart through a VoIP channel, a process of recognizing an object in a call image as motion data with respect to the game content, and a process of controlling a game element corresponding to the game content using a result of the recognizing.

According to some example embodiments, a new game environment and an entertaining element may be provided by providing a game based on object information included in a call image using VoIP technology.

According to some example embodiments, an effect of enjoying a game in real time while maintaining a call with a counterpart may become possible by controlling a game element based on an object recognition result with respect to a call image in a video call environment.

Further areas of applicability will become apparent from the description provided herein. The description and specific examples in this disclosure are intended for purposes of illustration only and are not intended to limit the scope of example embodiments.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
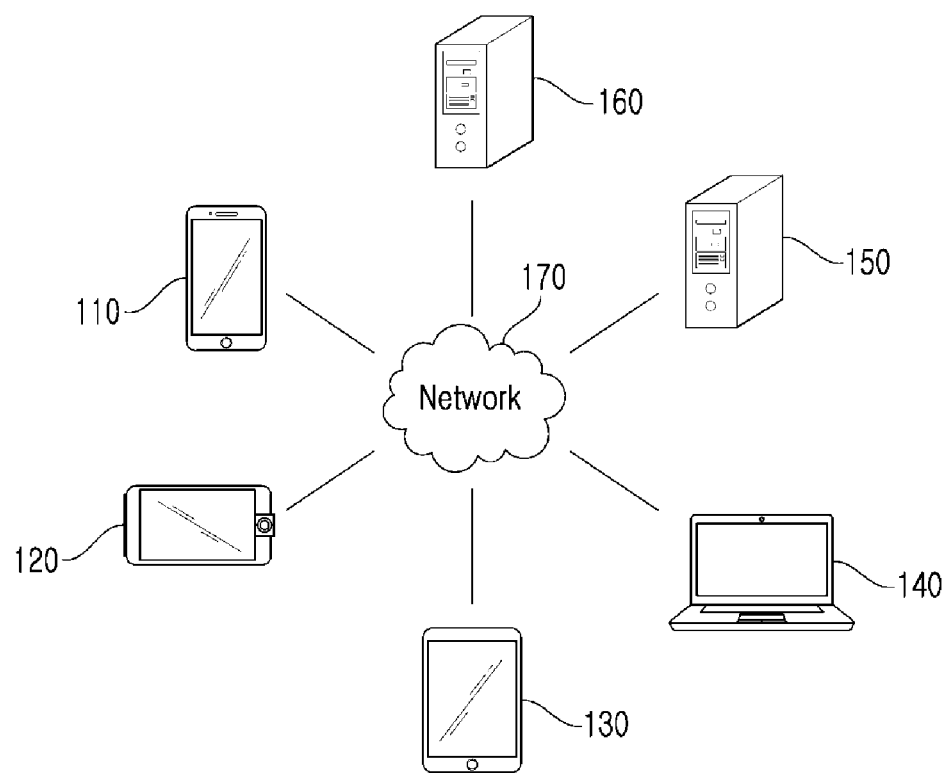
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments set forth hereinafter relate to technology for providing a game, and more particularly, to methods and/or systems for providing a game based on voice over Internet protocol (VoIP) technology and object recognition technology.

The example embodiments set forth hereinafter may provide a game based on object information included in an image during a video call, thereby achieving advantages in terms of entertaining element, diversity, and efficiency.

Herein, a video call may comprehensively refer to a video call that enables a user and a counterpart to exchange images and voices, for example, VoIP that converts images and voices into digital packets and transmits the same through a network using an IP address.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, a number of electronic devices and/or a number of servers are not limited thereto.

Each of the plurality of electronic devices 110, 120, 130, and 140 may be a fixed terminal or a mobile terminal configured as a computer device. For example, the plurality of electronic devices 110, 120, 130, and 140 may be a smartphone, a mobile phone, a navigation, a computer, a laptop computer, a digital broadcasting terminal, a personal digital assistant (PDA), a portable multimedia player (PMP), a tablet personal computer (PC), and the like. For example, although FIG. 1 illustrates the electronic device 110 in a shape of a smartphone, it is provided as an example only. Here, the electronic device 110 may refer to any type of various devices capable of communicating with other electronic devices 120, 130, and/or 140, and/or the servers 150 and/or 160 over the network 170 in a wired communication manner or in a wireless communication manner.

The communication scheme is not particularly limited and may include a communication method that uses a near field communication between devices as well as a communication method using a communication network, for example, a mobile communication network, the wired Internet, the wireless Internet, a broadcasting network, a satellite network, etc., which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides instructions, codes, files, contents, services, and the like through communication with the plurality of electronic devices 110, 120, 130, and/or 140 over the network 170. For example, the server 160 may provide a file for installing an application to the electronic device 110 connected over the network 170. In this case, the electronic device 110 may install the application using the file provided from the server 160. Also, the electronic device 110 may connect to the server 150 under control of at least one program, for example, browser or the installed application, or an operating system (OS) included in the electronic device 110 and may use a service or content provided from the server 150. For example, when the electronic device 110 transmits a service request message to the server 150 through the network 170 under control of the application, the server 150 may transmit a code corresponding to the service request message to the electronic device 110 and the electronic device 110 may provide content to the user by configuring and display a screen according to the code under control of the application.

Figure 2:
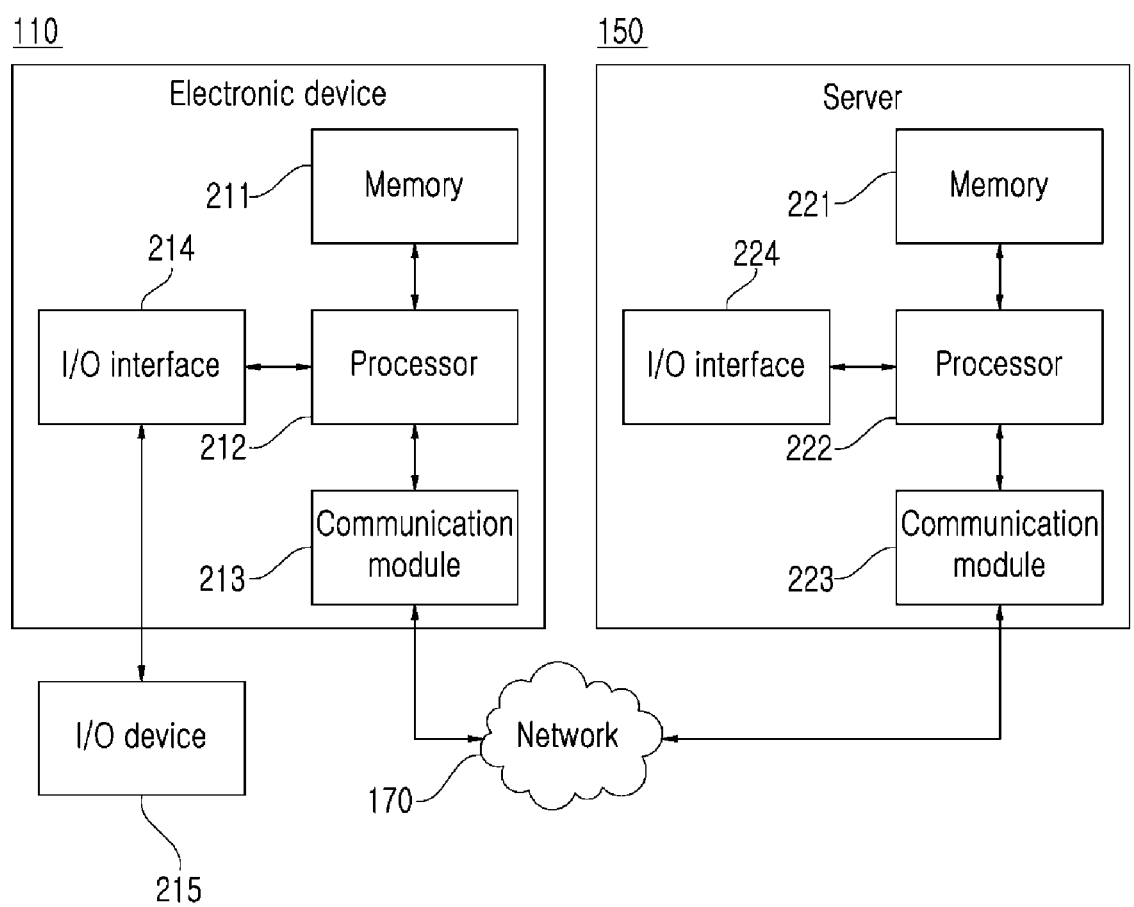
FIG. 2 is a block diagram illustrating an example of a configuration of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server. The same or similar components may be applicable to other electronic devices 120, 130, and/or 140, or the server 160, and also to still other electronic devices or still other servers.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), read only memory (ROM), a disk drive, a solid state drive, a flash memory, etc., as a non-transitory computer-readable storage medium. Also, an OS or at least one program code, for example, a code for an application installed and executed on the electronic device 110, may be stored in the memory 211, 221. Such software components may be loaded from another non-transitory computer-readable storage medium separate from the memory 211, 221 using a drive mechanism. The other non-transitory computer-readable storage medium may include, for example, a floppy drive, a disk, a tape, a DVD/CD-ROM drive, a memory card, etc. According to other example embodiments, software components may be loaded to the memory 211, 221 through the communication module 213, 223, instead of, or in addition to, the non-transitory computer-readable storage medium. For example, at least one program may be loaded to the memory 211, 221 based on a program, for example, the application, installed by files provided over the network 170 from developers or a file distribution system, for example, the server 160, which provides an installation file of the application.

The processor 212, 222 may be configured to process computer-readable instructions of a computer program by performing basic arithmetic operations, logic operations, and I/O operations. The computer-readable instructions may be provided from the memory 211, 221 and/or the communication module 213, 223 to the processor 212, 222. For example, the processor 212, 222 may be configured to execute received instructions in response to the program code stored in the storage device, such as the memory 211, 222.

The communication module 213, 223 may provide a function for communication between the electronic device 110 and the server 150 over the network 170, and may provide a function for communication between the electronic device 110 and/or the server 150 and another electronic device, for example, the electronic device 120 or another server, for example, the server 160. For example, the processor 212 of the electronic device 110 may transfer a request, for example, a search request, created based on the program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium further includable in the electronic device 110.

The I/O interface 214 may be a device used for interface with an I/O device 215. For example, an input device may include a keyboard, a mouse, a microphone, a camera, etc., and an output device may include a device, such as a display for displaying a communication session of the application. As another example, the I/O interface 214 may be a device for interface with an apparatus in which an input function and an output function are integrated into a single function, such as a touchscreen. In detail, when processing instructions of the computer program loaded to the memory 211, the processor 212 of the electronic device 110 may display a service screen configured using data provided from the server 150 or the electronic device 120, or may display content on the display through the I/O interface 214. Likewise, when processing instructions of the computer program loaded to the memory 221, the processor 222 of the server 150 may display information configured using data provided from the server 150 through the I/O interface 224.

According to other example embodiments, the electronic device 110 and the server 150 may include a greater or lesser number of components than a number of components shown in FIG. 2. For example, the electronic device 110 may include at least a portion of the I/O device 215, or may further include other components, for example, a transceiver, a global positioning system (GPS) module, a camera, a variety of sensors, a database, and the like. In detail, if the electronic device 110 is a smartphone, the electronic device 110 may be configured to further include a variety of components, for example, an accelerometer sensor, a gyro sensor, a camera module, various physical buttons, a button using a touch panel, an I/O port, a vibrator for vibration, etc., which are generally included in the smartphone. However, there is no need to clearly illustrate many components according to the related art.

Figure 3:
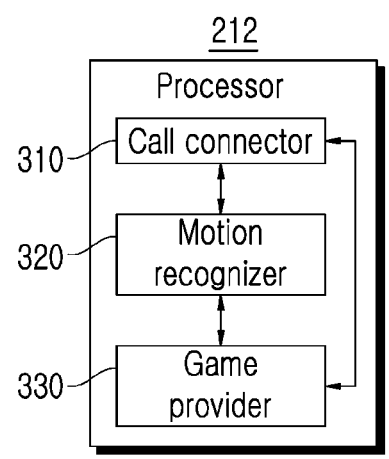
FIG. 3 is a block diagram illustrating an example of components includable in a processor of an electronic device according to at least one example embodiment.
Figure 4:
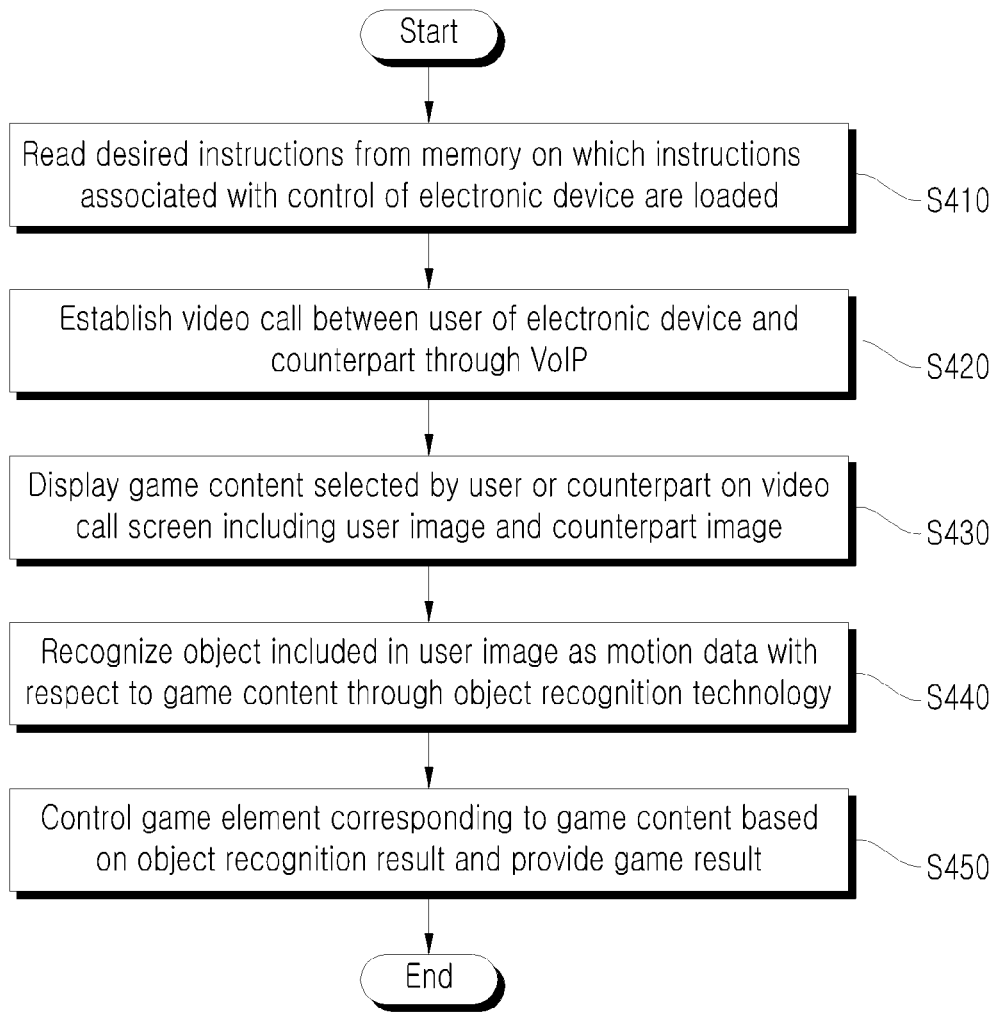
FIG. 4 is a flowchart illustrating an example of a method performed by an electronic device according to at least one example embodiment.

FIG. 3 is a block diagram illustrating an example of components includable in a processor of an electronic device according to at least one example embodiment, and FIG. 4 is a flowchart illustrating an example of a method performed by an electronic device according to at least one example embodiment.

A game providing system implemented as a computer may be configured in the electronic device 110. The game providing system may be configured as an application exclusive for a mobile terminal or a personal computer (PC) based program. The game providing system may be implemented in a form of independently operating program or configured in a form of in-app of a specific application, for example, a messenger, and to operate on the specific application. The game providing system may be implemented in a form of application installed on the electronic device 110 to provide a game in a video call environment based on VoIP technology through interoperation with a server 150.

For example, the game providing system implemented on the electronic device 110 based on instructions provided from the application installed on the electronic device 110 may perform a game providing method. To perform the game providing method of FIG. 4, the processor 212 of the electronic device 110 may include elements, a call connector 310, a motion recognizer 320, and a game provider 330, as shown in FIG. 3. The elements of the processor 212 may be selectively included in or excluded from the processor 212. Further, the elements of the processor 212 may be separated or merged to express the functions of the processor 212.

The processor 212 and the elements of the processor 212 may control the electronic device 110 to perform operations S410 through S450 included in the game providing method of FIG. 4. For example, the processor 212 and the elements of the processor 212 may be implemented to execute instructions according to at least one program code or OS code included in the memory 211.

Here, the elements of the processor 212 may be expressions of different functions of the processor 212 to be performed by the processor 212 according to the instructions provided from the program code stored in the electronic device 110 (for example, the instructions provided from the application run on the electronic device 110). For example, the call connector 310 may be used as a functional expression of the processor 212 that controls the electronic device 110 to connect a video call according to the above instructions.

In operation S410, the processor 212 may read desired instructions from the memory 211 on which instructions associated with control of the electronic device 110 are loaded. In this example, the read instructions may include instructions to control the processor 212 to perform operations S420 through S450 to be described below.

In operation S420, the call connector 310 may establish a video call between a user of the electronic device 110 and a counterpart through a VoIP channel. When the user of the electronic device 110 selects the counterpart as an opponent and selects game content, or when the user of the electronic device 110 receives a call connection request from an electronic device of the counterpart (e.g., when the counterpart selects the user as an opponent and selects the game content), the call connector 310 may connect the video call between the user and the counterpart. The game content may be selected by the user or the counterpart in a chatroom of a messenger, which corresponds to a communication session set between an account of the user and an account of the counterpart. In some example embodiments, the game content may be selected by the user or the counterpart during the video call between the user and the counterpart. In some example embodiments, in response to a selection of a separate option including a game function at a video call transmitting stage, selection and transmission of the game content may be performed concurrently. In some example embodiments, the opponent may be automatically specified as a participant of the chatroom or a call counterpart. When the video call between the user and the counterpart is connected, the call connector 310 may acquire a user image from the electronic device 110 in real time, receive a counterpart image from the electronic device of the counterpart, and display a video call screen including the user image and the counterpart image on a display of the electronic device 110.

In operation S430, the game provider 330 may display a competition game between the user and the counterpart by executing the game content selected by the user or the counterpart on the video call screen including the user image and the counterpart image. That is, the game provider 330 may provide a game activity in a video call environment based on the VoIP technology. During the video call between the user and the counterpart, the game content selected by the user or the counterpart may be executed concurrently on each device (hereinafter, interchangeably referred to as local).

In operation S440, the motion recognizer 320 may recognize an object included in the user image as motion data with respect to the game content through object recognition technology. For example, the motion recognizer 320 may recognize a face in the user image and recognize a motion (for example, an eye blinking motion, a mouth opening motion, or a face moving motion) of the recognized face. As another example, the motion recognizer 320 may recognize a motion of a thing or a body part (for example, a hand) in the user image. That is, the motion recognizer 320 may generate an object recognition result with respect to the user image as the motion data with respect to the game content. In some example embodiments, the motion recognizer 320 may recognize voice information (for example, a volume of sound) of the user together with the object recognition result as the motion data with respect to the game content. Furthermore, the motion recognizer 320 may recognize gesture information (for example, touch coordinates) input from the user with respect to the counterpart image as the motion data with respect to the game content. An object to be recognized may be determined in advance depending on game content. For example, in a case of a staring contest game, an eye blinking motion may be recognized in the user image. In a case of a big mouth game, a mouth opening motion may be recognized in the user image. In a case of a punch game, a motion of the user touching a face in the counterpart image may be recognized.

In operation S450, the game provider 330 may control a game element corresponding to the game content on the video call screen based on the object recognition result and provide a game result such as a win and loss. The game element may comprehensively refer to all textures synthesizable with an image as content including an image object and be implemented as a stationary object or a moving image object to which various forms of effects such as flash or animation are applied. The game provider 330 may reflect an effect corresponding to the object recognition result in the game element. In some example embodiments, the user image and the counterpart image may be exchanged in real time while being connected by the video call. The call connector 310 may configure and display the video call screen by exchanging call images reflecting the effect corresponding to the object recognition result between the user and the counterpart. Further, the game provider 330 may calculate a game result in response to a mission completed while storing information associated with a game progress at a local, and exchange and share the information associated with the game progress and the game result with the counterpart. That is, the game provider 330 may share the game progress corresponding to the object recognition result and the game result with the counterpart, and determine a win and loss based on the shared information. Further, when the gesture information of the user with respect to the counterpart image is recognized as the motion data with respect to the game content depending on game content, the game provider 330 may transmit the recognized gesture information to the electronic device of the counterpart. In this example, the electronic device of the counterpart may receive the gesture information of the user as the motion data with respect to the game content from the electronic device 110, and reflect an effect corresponding thereto in the game element. For example, in a case of the punch game of attacking a face of an opponent, coordinates of touches on images of opponents may be transmitted to the user as well as the opponents, and images reflecting corresponding effects at positions that match the coordinates received from the opponents may be exchanged as call images.

The call connector 310 may connect a separate channel to share the game progress information between the electronic device 110 and the electronic device of the counterpart, and the game provider 330 may share a current game progress or information associated with a game result with the electronic device of the counterpart through the channel generated between the electronic device 110 and the electronic device of the counterpart in response to VoIP being connected. Also, the game provider 330 may share the game progress in real time while exchanging additional metadata associated with the game with the electronic device of the counterpart through the VoIP channel.

The game provider 330 may share overall game data including the motion data with respect to the game content, the game progress, or the information associated with the game result with the electronic device of the counterpart, thereby displaying current game state information (e.g., a game progress rate, a current score, a score gap, and/or a win and loss prediction) in real time, and displaying win and loss information corresponding to the game result, the game progress, and/or various effects corresponding to the game result on the corresponding device. The user image and the counterpart image may be exchanged in real time while being connected by the video call. The call connector 310 may configure and display the video call screen by exchanging game progress screens of locals as the call images between the user and the counterpart.

The game result may be directly calculated while storing the information associated with the game progress at a local (e.g., at each electronic device) and then shared with the counterpart. Depending on a case, the electronic device of the user selecting the game content may serve as a master such that the master device determines an element or elements desired for playing the game, or collect desired data and calculate the game result.

Figure 5:
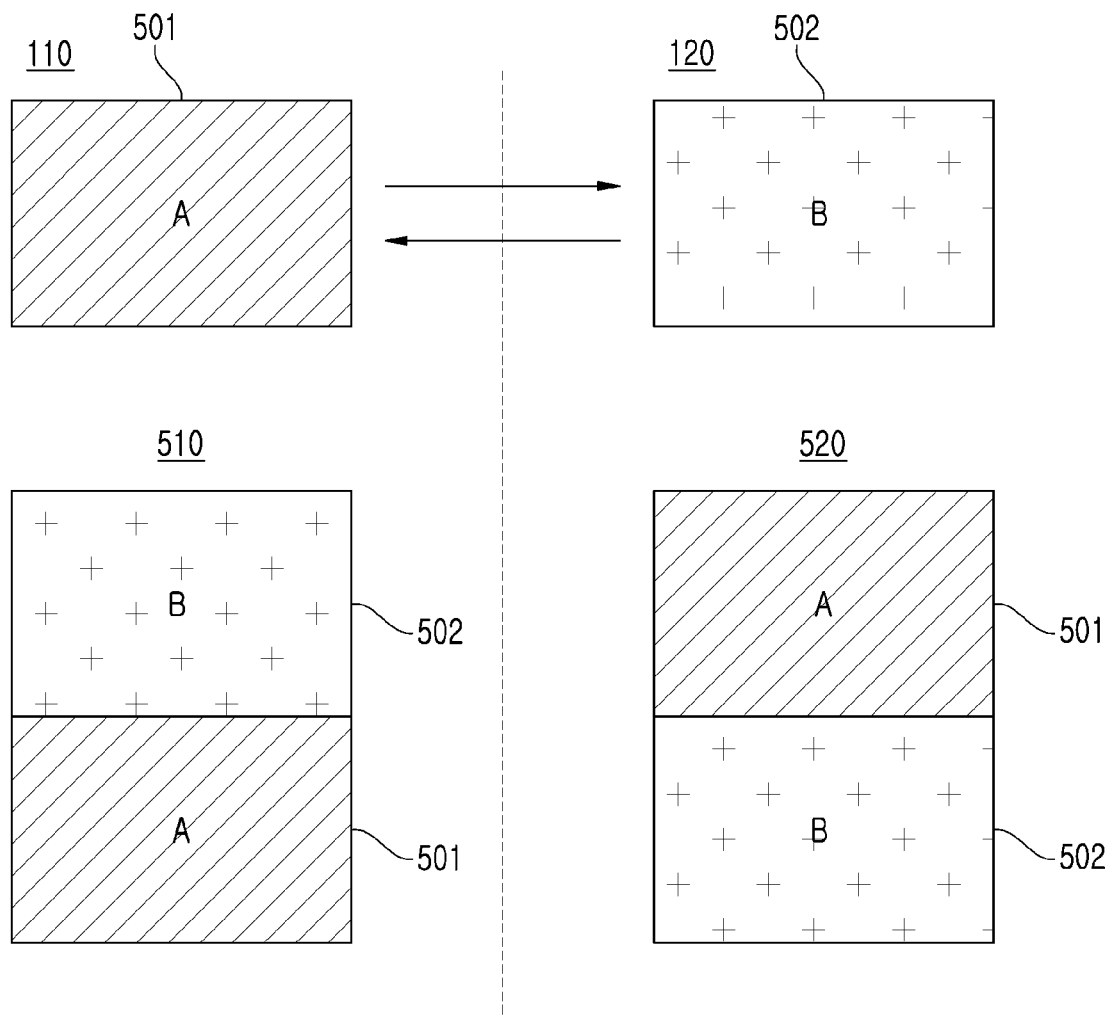
FIGS. 5 and 6 illustrate examples of configurations of video call screens according to some example embodiments.
Figure 6:
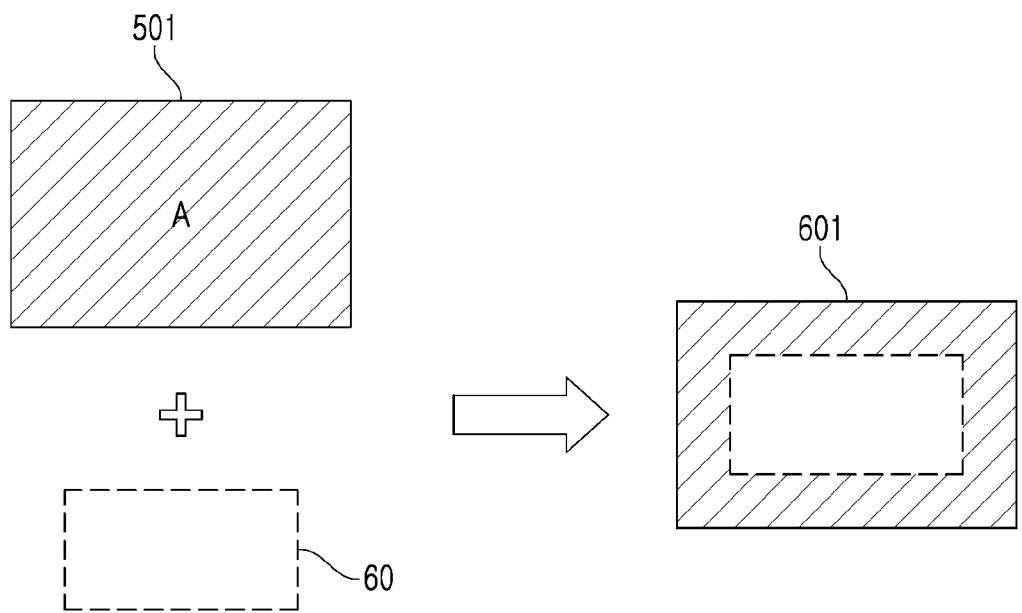

FIGS. 5 and 6 illustrate examples of configurations of video call screens according to some example embodiments.

Referring to FIG. 5, the electronic device 110 of the user may receive a counterpart image 502 from the electronic device 120 of the counterpart, concurrently while transmitting a user image 501 acquired using a camera to the electronic device 120 of the counterpart in real time when the user is connected with the counterpart by the video call.

The electronic device 110 may display a video call screen 510 including the user image 501 and the counterpart image 502 on the display while the connection of the video call is maintained. For example, the electronic device 110 may place the user image 501 being a local image in a lower position and place the counterpart image 502 in an upper position.

Similarly, the electronic device 120 of the counterpart may also receive the user image 501 in real time and display a video call screen 520 including the user image 501 and the counterpart image 502 during the video call between the user and the counterpart.

Game content selected by the user or the counterpart may be concurrently executed at locals (e.g., in the respective electronic devices 110 and 120) during the video call between the user and the counterpart, and the video call screen may be configured and displayed by exchanging images reflecting effects corresponding to object recognition results between the user and the counterpart during a game.

Referring to FIG. 6, the electronic device 110 may recognize an object in the user image 501 as motion data with respect to the game content and control a game element of the game content currently being executed based on an object recognition result. In this example, the electronic device 110 may synthesize a texture 60 of an effect corresponding to the object recognition result with the user image 501 and display a synthetic image 601 on the video call screen 520, concurrently while transmitting the synthetic image 601 to the electronic device 120 of the counterpart. Similarly, in a case of the counterpart image 502, the electronic device 120 of the counterpart may transmit an image synthesized with a texture of an effect corresponding to an object recognition result with respect to the counterpart image 502 to the electronic device 110.

Thus, it is possible to implement a competition game in a video call environment by exchanging images where effects corresponding to the object recognition results are implemented by the game content being executed at locals (e.g., the user and the counterpart).

In a case of some items of game content, it is also possible to recognize gesture information of the user with respect to the counterpart image, rather than an object recognition result with respect to a local image, as motion data with respect to the game content. The electronic device 110 may recognize the gesture information, for example, touch coordinates, of the user with respect to the counterpart image 502 and transmit the recognized gesture information to the electronic device of the counterpart. In some example embodiments, the electronic device of the counterpart may receive the gesture information of the user as the motion data with respect to the game content from the electronic device 110, and reflect an effect corresponding thereto in a game element. For example, in a case of a punch game of attacking a face of an opponent, coordinates of touches on images of opponents may be transmitted to the user (as well as the opponents), and images reflecting corresponding effects at positions that match the coordinates received from the opponents may change call images.

FIGS. 7A-7D are a diagram illustrating an example of a competition game provided in a video call environment according to at least one example embodiment.

Figure 7A:
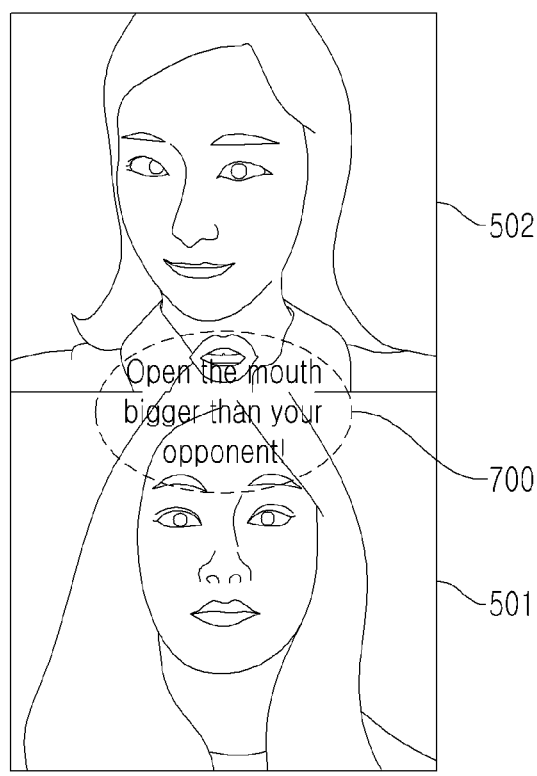
FIGS. 7A, 7B, 7C, and 7D illustrate an example of a competition game provided in a video call environment according to at least one example embodiment.
Figure 7B:
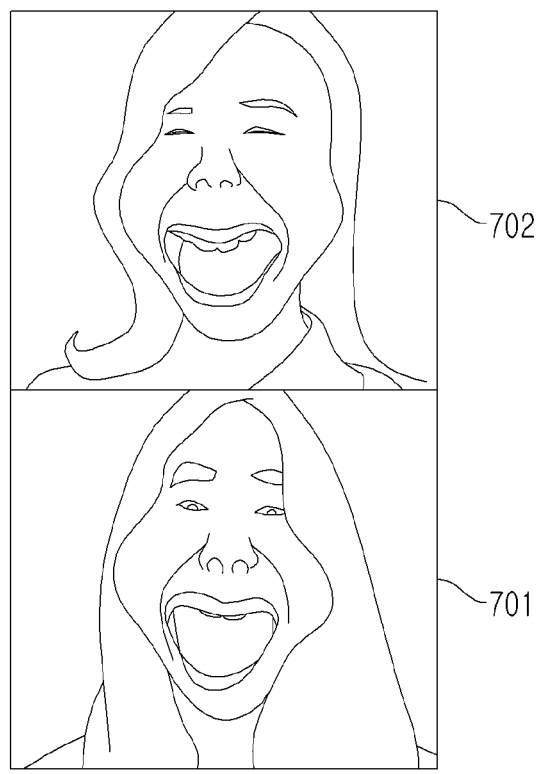
Figure 7C:
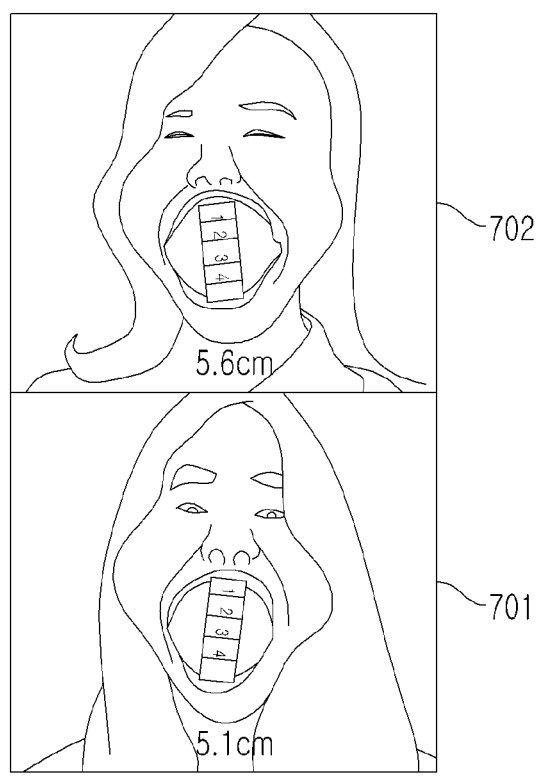
Figure 7D:

FIGS. 7A-7D illustrate a process of playing a "big mouth game" in a video call environment. When a video call is established between the user and the counterpart, game content may be executed concurrently, and guide information 700 of the "big mouth game" may be displayed on the video call screen including the user image 501 and the counterpart image 502 for a desired (or alternatively, predetermined) time, and then the game may start (FIG. 7A). The electronic device 110 may recognize a mouth opening motion in the user image 501 through face recognition, display a synthetic image 701, in which a texture of an effect corresponding to a recognition result is synthesized, on the video call screen, and transmit the synthetic image 701 to the electronic device of the counterpart (FIG. 7B). Similarly, the electronic device 110 may receive a synthetic image 702, in which an effect corresponding to a result of recognizing a mouth opening motion in the counterpart image 502 is implemented, from the electronic device of the counterpart, and display the synthetic image 702 on the video call screen. The electronic device 110 may share game progress information with the counterpart in real time while displaying the synthetic images 701 and 702 of the game progress corresponding to the results of recognizing the mouth opening motions while the game is played on the video call screen (FIG. 7C). When the game is over, the electronic device 110 may determine a win and loss of the user and the counterpart based on the information shared with the counterpart and display win and loss information 800 on the video call screen (FIG. 7D). The "big mouth game" is to accomplish a mission by opening a mouth. The win and loss may be determined by recognizing mouth opening motions in call images and comparing sizes of the mouths opened by the corresponding motions.

FIGS. 8A-8D illustrate another example of a competition game provided in a video call environment according to at least one example embodiment.

Figure 8A:
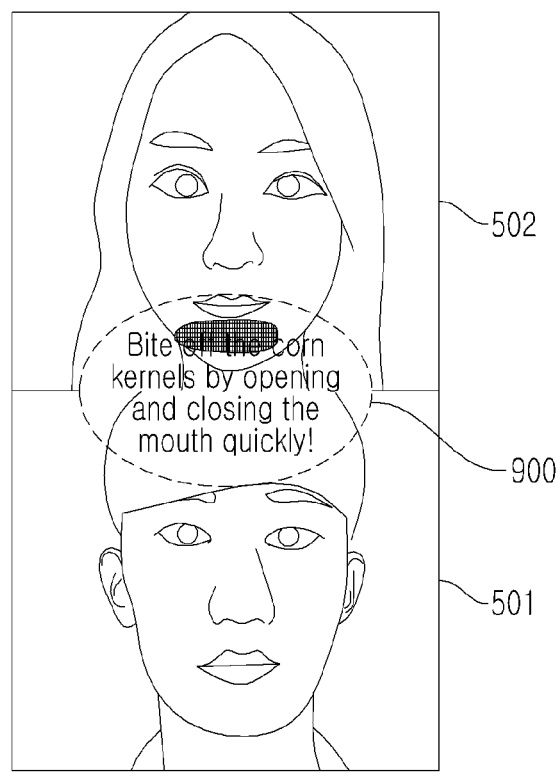
FIGS. 8A, 8B, 8C, and 8D illustrate another example of a competition game provided in a video call environment according to at least one example embodiment.
Figure 8B:
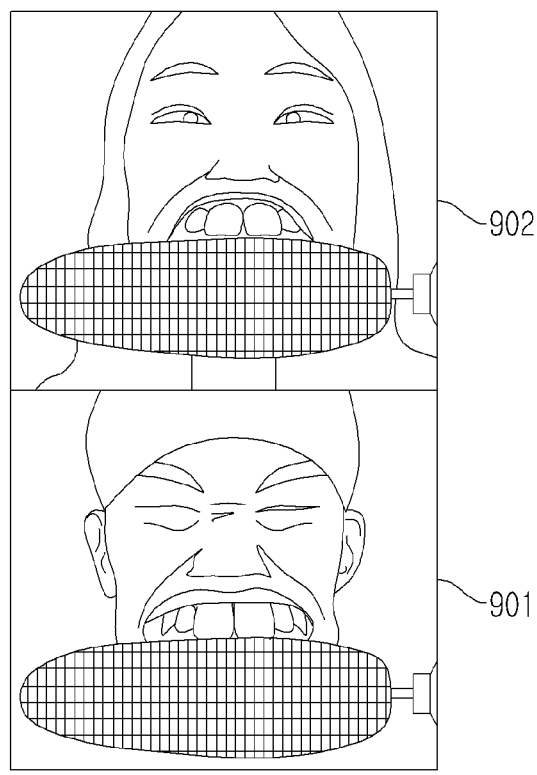
Figure 8C:
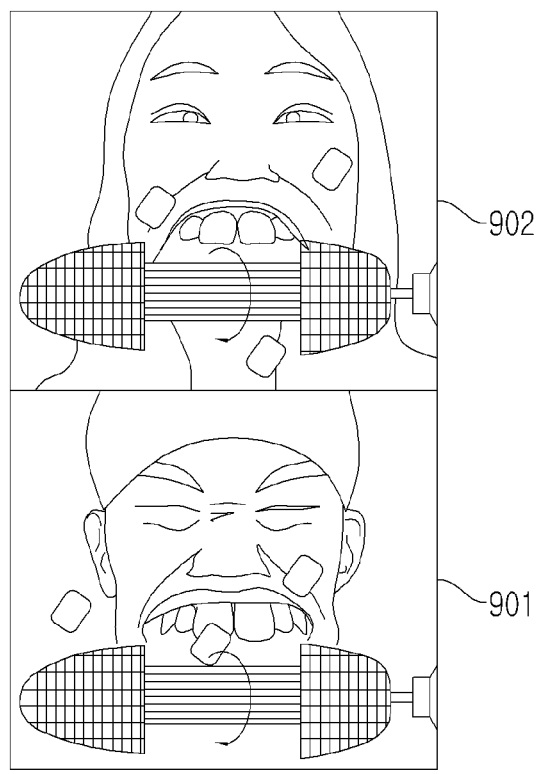
Figure 8D:

FIGS. 8A-8D illustrate a process of playing a "corn eating game" in a video call environment. When a video call is established between the user and the counterpart, game content may be executed concurrently, and guide information 900 of the "corn eating game" may be displayed on the video call screen including the user image 501 and the counterpart image 502 for a desired (or alternatively, predetermined) time, and then the game may start (FIG. 8A). The electronic device 110 may recognize a mouth opening and closing motion in the user image 501 through face recognition, display a synthetic image 901, in which a texture of an effect corresponding to a recognition result is synthesized, on the video call screen, and transmit the synthetic image 901 to the electronic device of the counterpart (FIG. 8B). Similarly, the electronic device 110 may receive a synthetic image 902, in which an effect corresponding to a result of recognizing a mouth opening and closing motion in the counterpart image 502 is implemented, from the electronic device of the counterpart and display the synthetic image 902 on the video call screen. The electronic device 110 may share game progress information with the counterpart in real time while displaying the synthetic images 901 and 902 of the game progress corresponding to the results of recognizing the mouth opening and closing motions while the game is played (FIG. 8C). When the game is over, the electronic device 110 may determine a win and loss of the user and the counterpart based on the information shared with the counterpart and display win and loss information 1000 on the video call screen (FIG. 8D). The "corn eating game" is to accomplish a mission by repeatedly opening and closing a mouth. The win and loss may be determined based on speeds of opening and closing motions of mouths by recognizing the corresponding motions in call images.

FIGS. 9A-9D illustrate another example of a competition game provided in a video call environment according to at least one example embodiment.

Figure 9A:
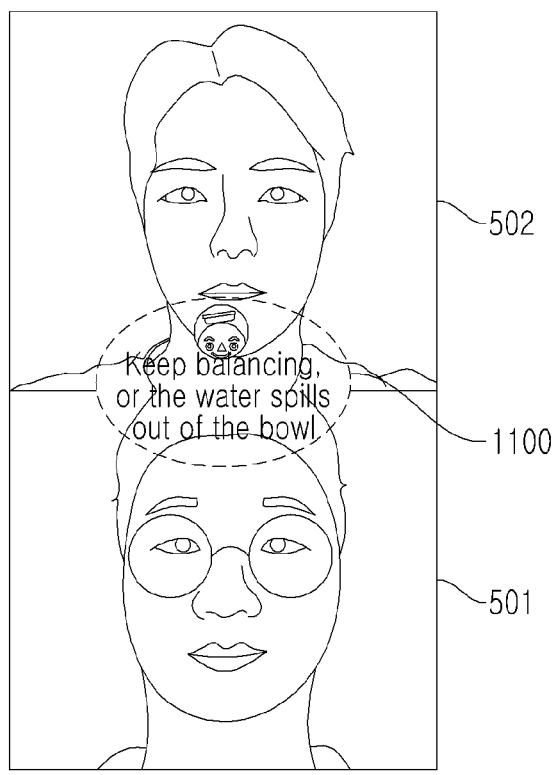
FIGS. 9A, 9B, 9C, and 9D illustrate another example of a competition game provided in a video call environment according to at least one example embodiment.
Figure 9B:
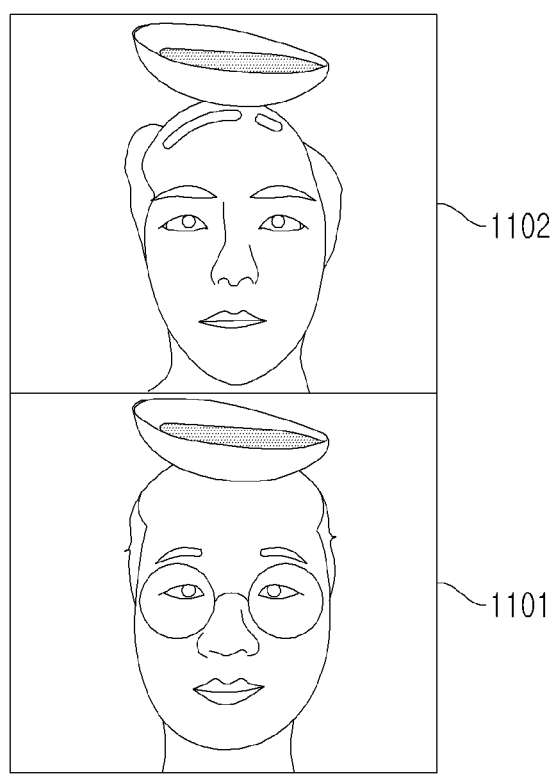
Figure 9C:
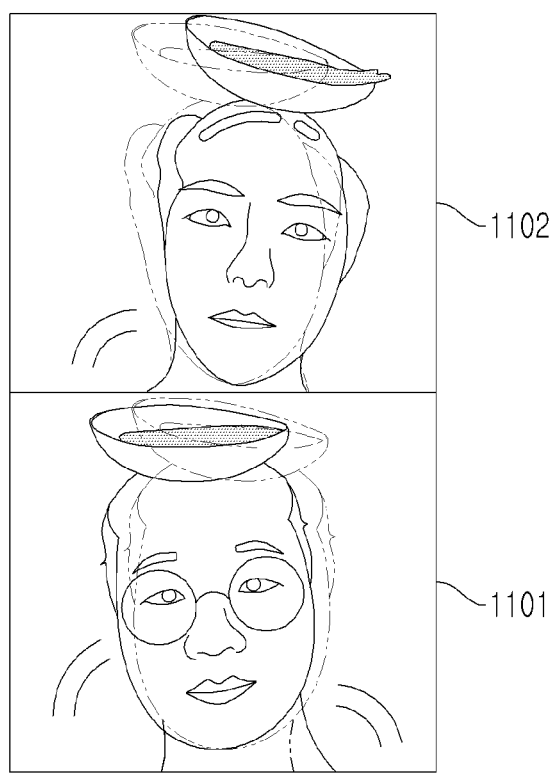
Figure 9D:
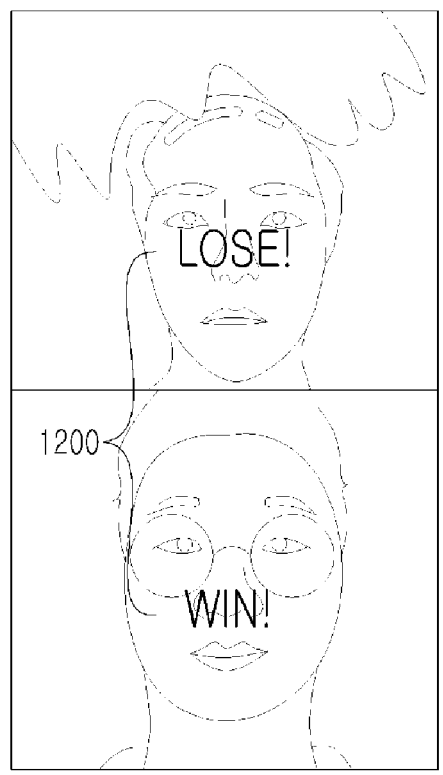

FIGS. 9A-9D illustrate a process of playing a "balancing game" in a video call environment. When a video call is established between the user and the counterpart, game content may be executed concurrently, and guide information 1100 of the "balancing game" may be displayed on the video call screen including the user image 501 and the counterpart image 502 for a desired (or alternatively, predetermined) time, and then the game may start (FIG. 9A). The electronic device 110 may recognize a position and a gradient of a face in the user image 501 through face recognition, display a synthetic image 1101, in which a texture of an effect corresponding to a recognition result is synthesized, on the video call screen, and transmit the synthetic image 1101 to the electronic device of the counterpart (see FIG. 9B). Similarly, the electronic device 110 may receive a synthetic image 1102, in which an effect corresponding to a result of recognizing a position and a gradient of a face in the counterpart image 502 is implemented, from the electronic device of the counterpart and display the synthetic image 1102 on the video call screen. The electronic device 110 may share game progress information with the counterpart in real time while displaying the synthetic images 1101 and 1102 of the game progress corresponding to the results of recognizing the positions and the gradients of the faces while the game is played (FIG. 9C). When the game is over, the electronic device 110 may determine a win and loss of the user and the counterpart based on the information shared with the counterpart and display win and loss information 1200 on the video call screen (FIG. 9D). The "balancing game" is to accomplish a mission by balancing. The win and loss may be determined based on balancing motions of game objects by recognizing positions and gradients of faces in call images.

FIGS. 10A-10D are diagrams illustrating a further example of a competition game provided in a video call environment according to at least one example embodiment.

Figure 10A:
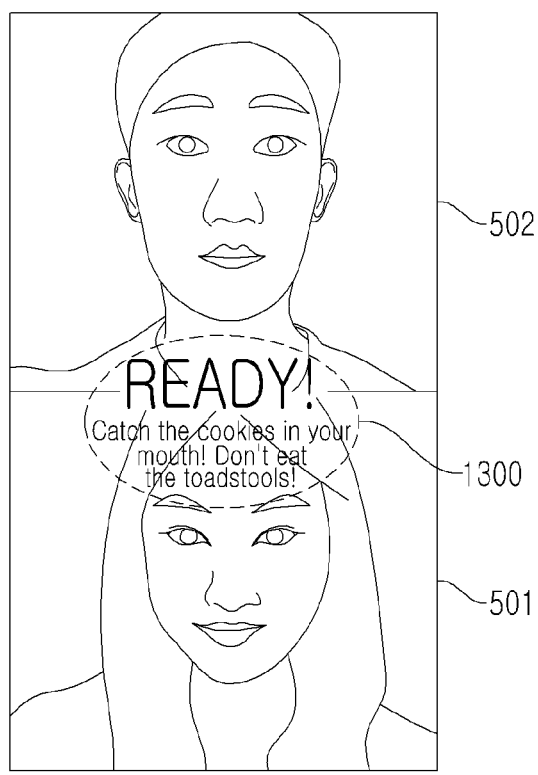
FIGS. 10A, 10B, 10C, and 10D illustrate another example of a competition game provided in a video call environment according to at least one example embodiment.
Figure 10B:
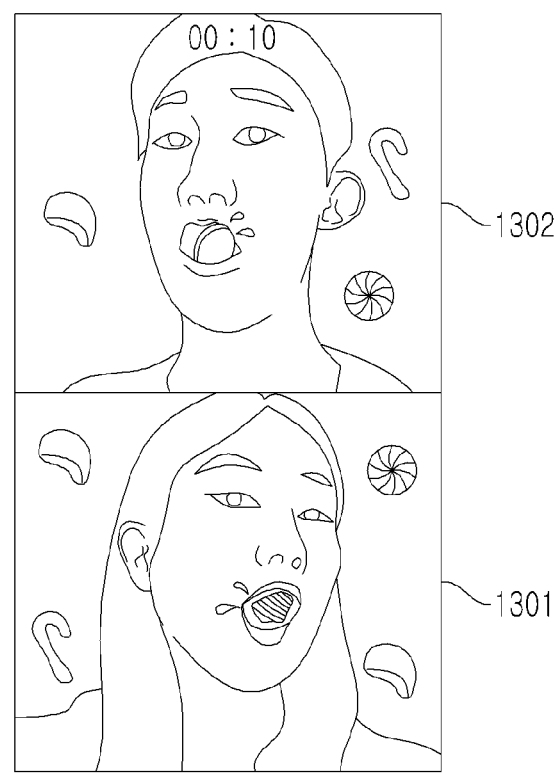
Figure 10C:
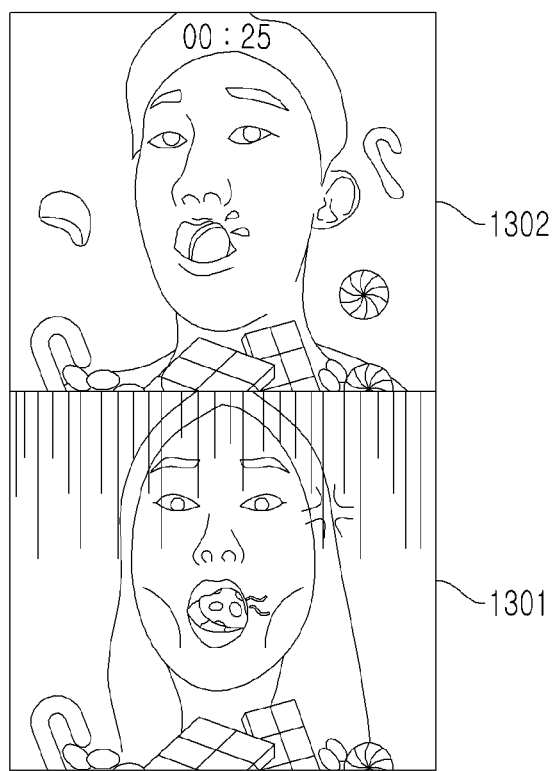
Figure 10D:

FIGS. 10A-10D illustrate a process of playing a "cookie catching game" in a video call environment. When a video call is established between the user and the counterpart, game content may be executed concurrently, and guide information 1300 of the "cookie catching game" may be displayed on the video call screen including the user image 501 and the counterpart image 502 for a desired (or alternatively, predetermined) time, and then the game may start (FIG. 10A). The electronic device 110 may recognize a mouth opening and closing motion in the user image 501 through face recognition, display a synthetic image 1301, in which a texture of an effect corresponding to a recognition result is synthesized, on the video call screen, and transmit the synthetic image 1301 to the electronic device of the counterpart (FIG. 10B). Similarly, the electronic device 110 may receive a synthetic image 1302, in which an effect corresponding to a result of recognizing a mouth opening and closing motion in the counterpart image 502 is implemented, from the electronic device of the counterpart and display the synthetic image 1302 on the video call screen. The electronic device 110 may share game progress information with the counterpart in real time while displaying the synthetic images 1301 and 1302 of the game progress corresponding to the results of recognizing the mouth opening and closing motions while the game is played (FIG. 10C). When the game is over, the electronic device 110 may determine a win and loss of the user and the counterpart based on the information shared with the counterpart and display win and loss information 1400 on the video call screen (FIG. 10D). The "cookie catching game" is to accomplish a mission by opening a mouth while moving a face. The win and loss may be determined based on results of accomplishing the mission by mouth opening motions by recognizing positions of faces and the corresponding motions in call images.

FIGS. 11A-11D illustrate another example of a competition game provided in a video call environment according to at least one example embodiment.

Figure 11A:
FIGS. 11A, 11B, 11C, and 11D illustrate another example of a competition game provided in a video call environment according to at least one example embodiment.
Figure 11B:
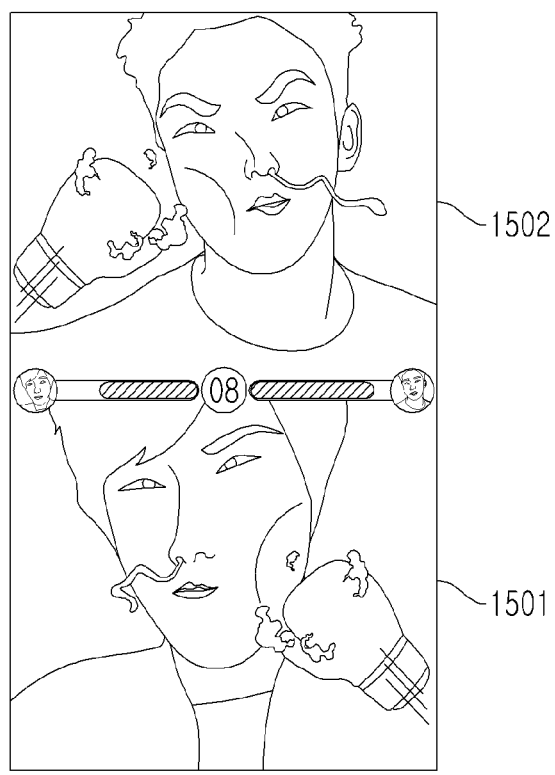
Figure 11C:
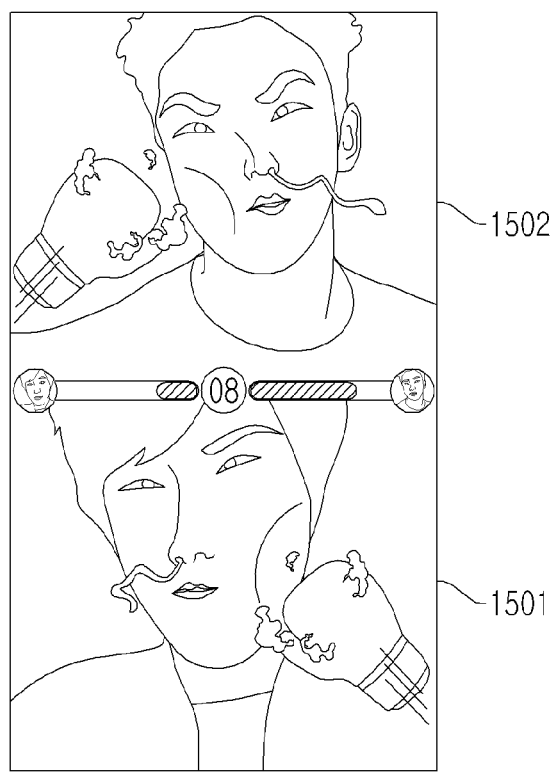
Figure 11D:

FIGS. 11A-11D illustrate a process of playing a "punch game" in a video call environment. When a video call is established between the user and the counterpart, game content may be executed concurrently, and guide information 1500 of the "punch game" may be displayed on the video call screen including the user image 501 and the counterpart image 502 for a desired (or alternatively, predetermined) time, and then the game may start (FIG. 11A). The electronic device 110 may recognize coordinates of a touch of the user on the counterpart image 502, transmit the recognized coordinates to the electronic device of the counterpart, receive a synthetic image 1502, in which a texture of an effect corresponding to a result of recognizing a position that matches the coordinates is synthesized, from the electronic device of the counterpart, and display the synthetic image 1502 on the video call screen (FIG. 11B). Similarly, the electronic device 110 may receive coordinates of a touch of the counterpart on the user image 501 from the electronic device of the counterpart, display a synthetic image 1501, in which a texture of an effect corresponding to a result of recognizing a position that matches the received coordinates is synthesized, on the video call screen, and transmit the synthetic image 1501 to the electronic device of the counterpart. That is, coordinates of touches on images of opponents may be transmitted to each other, and images reflecting effects at positions that match the coordinates received from the opponents may be exchanged as call images. The electronic device 110 may share game progress information with the counterpart in real time while displaying the synthetic images 1501 and 1502 of the game progress corresponding to the results of recognizing touch motions on the images of the opponents while the game is played (FIG. 11C). When the game is over, the electronic device 110 may determine a win and loss of the user and the counterpart based on the information shared with the counterpart and display win and loss information 1600 on the video call screen (FIG. 11D). The "punch game" is to accomplish a mission by touching. The win and loss may be determined based on speeds or counts of motions of touching faces of opponents by recognizing the corresponding motions in call images.

Thus, the example embodiments provided herein may provide a competition game based on VoIP technology and object recognition technology.

According to the example embodiments, it is possible to provide a new game environment and an entertaining element by providing a game based on object information included in a call image using VoIP technology. Further, it is possible to provide an effect of enjoying a game in real time while maintaining a call with a counterpart by controlling a game element based on an object recognition result with respect to a call image in a video call environment.

The systems and or apparatuses described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

Methods according to example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are configured to store and perform program instructions, such as read-only memory (ROM, random access memory (RAM, flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing description has been provided for purposes of illustration and description. It is not intended to be exhaustive or to limit example embodiments. Individual elements or features of a particular example embodiment are generally not limited to that particular example embodiment, but may be interchangeable with individual elements or features of a different example embodiment, even if not specifically shown or described. While some example embodiments have been particularly shown and described, it will be understood by one of ordinary skill in the art that variations in form and detail may be made therein without departing from the spirit and scope of the claims.

What is claimed is:

1. A game providing method of a first electronic device configured as a computer, the method comprising:
executing game content on a video call screen in response to a video call being established between a user of the first electronic device and a counterpart of a second electronic device, the video call screen including a user image of the user and a counterpart image of the counterpart, the game content being concurrently executed on the video call screen of each of the first electronic device and the second electronic device;
in response to a first recognition of recognizing first coordinates of a first touch of the counterpart on the user image of the video call screen of the second electronic device, generating a first synthetic image in which a first texture of a first effect corresponding to a result of recognizing a first position that matches the received first coordinates on the user image is synthesized;
controlling a first game content portion of the game content associated with the user based on the first recognition;
in response to a second recognition of recognizing second coordinates of a second touch of the user on the counterpart image of the video call screen of the first electronic, generating a second synthetic image in which a second texture of a second effect corresponding to a result of recognizing a second positon that matches the received second coordinates on the counterpart image is synthesized;
controlling a second game content portion of the game content associated with the counterpart based on the second recognition; and
displaying a result of the game content based on a first result of controlling the first game content portion and a second result of controlling the second game content portion,
wherein the first recognition and the second recognition are concurrently performed based on a progress of the game content concurrently executed on the video call screen of each of the first electronic device and the second electronic device.

2. The method of claim 1, further comprising:
synthesizing the first texture of the first effect corresponding to a third result of recognizing at least one game element of the game content corresponding to the user, and
displaying the first synthetic image.

3. The method of claim 1, wherein
the first recognition and the second recognition comprise a recognition of a face of the user in the user image and a recognition of a face of the counterpart in the counterpart image, respectively, using face recognition technology.

4. The method of claim 1, wherein
the first recognition comprises receiving first gesture information of the counterpart from the second electronic device of the counterpart and recognizing a position that matches location information associated with the first gesture information in the user image.

5. The method of claim 1, further comprising:
displaying the video call screen including the user image of the user and the counterpart image of the counterpart by exchanging the user image and the counterpart image in real time in response to the video call being established.

6. The method of claim 1, further comprising:
sharing information associated with the progress of the game content corresponding to the first result of controlling the first game content portion and the second result of controlling the second game content portion with the first electronic device and the second electronic device,
wherein the displaying comprises determining a win and loss of the user and the counterpart based on the first result of controlling the first game content portion and the second result of controlling the second game content portion and displaying the determined win and loss on the video call screen.

7. The method of claim 1, further comprising:
displaying the result of the game content on the video call screen during the video call in response to a selection of the game content by the user or the counterpart in a messenger chatroom, which corresponds to a communication session set between a user account of the user and a counterpart account of the counterpart.

8. The method of claim 1, further comprising:
providing the game content selected by the user or the counterpart in response to the video call being established between the user and the counterpart.

9. The method of claim 1, the first recognition further comprises a recognition of voice information of the user, and the second recognition further comprises a recognition of voice information of the counterpart.

10. A non-transitory computer-readable recording medium storing instructions that, when executed by a processor, cause the computer to perform the game providing method of claim 1.

11. The method of claim 1, further comprising:
receiving, from the second electronic device of the counterpart, data associated with a third result of recognizing a motion of an object in the counterpart image, the object based on a type of the game content in the counterpart image, and
displaying the second synthetic image of the counterpart image based on the received data, the second synthetic image being an image of one of game elements of the game content to which the second effect corresponding to a result of recognizing the object of the counterpart has been synthesized to one of the game elements corresponding to the counterpart, on the video call screen.

12. The method of claim 1, wherein the displaying includes displaying game guide information together with the game content on the video call screen in response to the video call being established between the user of the first electronic device and the counterpart of the second electronic device.

13. The method of claim 11, further comprising:
displaying, on the video call screen during the game content being executed, the first synthetic image and the second synthetic image,
wherein, in the second electronic device, in response to a corresponding motion of the object of the counterpart being performed, the corresponding motion of the object is recognized in the second synthetic image for controlling the game content.

14. A game providing system of a first electronic device configured as a computer, the game providing system comprising:
a memory configured to store computer-readable instructions; and
at least one processor configured to execute the computer-readable instructions, the at least one processor is configured to cause the first electronic device to,
execute game content on a video call screen in response to a video call being established between a user of the first electronic device and a counterpart of a second electronic device, the video call screen including a user image of the user and a counterpart image of the counterpart, the game content being concurrently executed on the video call screen of each of the first electronic device and the second electronic device,
in response to a first recognition of recognizing first coordinates of a first touch of the counterpart on the user image of the video call screen of the second electronic device, generating a first synthetic image in which a first texture of a first effect corresponding to a result of recognizing a first position that matches the received first coordinates on the user image is synthesized,
control a first game content portion of the game content associated with the user based on the first recognition,
in response to a second recognition of recognizing second coordinates of a second touch of the user on the counterpart image of the video call screen of the first electronic device, generate a second synthetic image in which a second texture of a second effect corresponding to a result of recognizing a second position that matches the received second coordinates on the counterpart image is synthesized,
control a second game content portion of the game content associated with the counterpart based on the second recognition, and
display a result of the game content based on a first result of controlling the first game content portion and a second result of controlling the second game content portion,
wherein the at least one processor is configured to cause the first electronic device to perform the first recognition and the second recognition concurrently based on a progress of the game content concurrently executed on the video call screen of each of the first electronic device and the second electronic device.

15. The game providing system of claim 14, wherein the at least one processor is further configured to cause the first electronic device to,
synthesize the first texture of the first effect corresponding to a third result of recognizing at least one game element of the game content corresponding to the user, and
display the first synthetic image.

16. The game providing system of claim 14, wherein the at least one processor is configured to the first electronic device to display the video call screen including the user image of the user and the counterpart image of the counterpart by exchanging the user image and the counterpart image in real time in response to the video call being established.

17. The game providing system of claim 14, wherein the at least one processor is configured to cause the first electronic device to recognize a face of the user in the user image using face recognition technology.

18. The game providing system of claim 14, wherein the at least one processor is configured to cause the first electronic device to perform the first recognition by receiving first gesture information of the counterpart from the second electronic device of the counterpart and recognizes a position that matches location information associated with the first gesture information in the user image.

19. The game providing system of claim 14, wherein the at least one processor is further configured to cause the first electronic device to,
share information associated with the progress of the game content corresponding to the first result of controlling the first game content portion and the second result of controlling the second game content portion with the first electronic device and the second electronic device, determine a win and loss of the user and the counterpart based on the first result of controlling the first game content portion and the second result of controlling the second game content portion, and display the determined win and loss on the video call screen.

20. The game providing system of claim 14, wherein the at least one processor is configured to cause the first electronic device to display the result of the game content on the video call screen during the video call in response to selecting the game content by the user or the counterpart in a messenger chatroom, which corresponds to a communication session set between a user account of the user and a counterpart account of the counterpart.

21. The game providing system of claim 14, wherein the at least one processor is further configured to display, on the video call screen during the game content being executed, the first synthetic image and the second synthetic image in which the second effect associated with the game content is synthesized with an object of the counterpart included in the counterpart image, and the second electronic device is configured to recognize a corresponding motion of the object in the second synthetic image for controlling the game content, in response to the corresponding motion of the object of the counterpart being performed.

* * * * *